(12) United States Patent
Soukup et al.

(10) Patent No.: US 12,304,683 B2
(45) Date of Patent: May 20, 2025

(54) HARD DISK DRIVE TRANSFORMATION FROM OEM PACKAGING TO AUTOMATION FRIENDLY CONTAINERS

(71) Applicant: Google LLC, Mountain View, CA (US)

(72) Inventors: Rachel Soukup, Seattle, WA (US); Michael Helsel, Seattle, WA (US); Robert Hales Lundgreen, West Haven, UT (US); Bryan Edward Overdiek, North Odgen, UT (US); George T. Davies, Brigham City, UT (US)

(73) Assignee: Google LLC, Mountain View, CA (US)

( * ) Notice: Subject to any disclaimer, the term of this patent is extended or adjusted under 35 U.S.C. 154(b) by 1015 days.

(21) Appl. No.: 17/344,237

(22) Filed: Jun. 10, 2021

(65) Prior Publication Data

US 2021/0403248 A1    Dec. 30, 2021

Related U.S. Application Data

(60) Provisional application No. 63/044,182, filed on Jun. 25, 2020.

(51) Int. Cl.
*B65G 47/48* (2006.01)
*B65B 69/00* (2006.01)
(Continued)

(52) U.S. Cl.
CPC ...... *B65B 69/0033* (2013.01); *B65B 69/0008* (2013.01); *B65G 47/48* (2013.01);
(Continued)

(58) Field of Classification Search
CPC . B65B 69/0033; B65B 69/0008; B65B 5/105; B65B 57/04; B65B 25/002;
(Continued)

(56) References Cited

U.S. PATENT DOCUMENTS

| | | | |
|---|---|---|---|
| 2,729,885 A * | 1/1956 | Wahl | B65B 69/0033 414/412 |
| 3,137,068 A * | 6/1964 | Quigley | B65B 69/0033 30/2 |

(Continued)

FOREIGN PATENT DOCUMENTS

| | | |
|---|---|---|
| CN | 2883181 Y | 3/2007 |
| CN | 103129758 A | 6/2013 |

(Continued)

OTHER PUBLICATIONS

Extended European Search Report for European Patent Application No. 20213051.4 dated Jun. 7, 2021. 5 pages.

(Continued)

*Primary Examiner* — Thomas M Wittenschlaeger
(74) *Attorney, Agent, or Firm* — Lerner David LLP

(57) ABSTRACT

A system includes a cutting sub-system arranged for cutting a box into a first half and a second half and including at least one pair of cutting elements, a dunnage gripper sub-system arranged downstream of the cutting sub-system and including a dunnage gripper configured to selectively grip and release a portion of the box, and a robotic system including at least a first robotic arm and a second robotic arm. The first robotic arm includes a plurality of grippers configured to selectively grip and release items contained in the box. The second robotic arm includes a plurality of grippers configured to selectively position the items into a tote positioned at a second predetermined location.

19 Claims, 12 Drawing Sheets

(51) Int. Cl.
 *B65G 47/82* (2006.01)
 *B65G 47/90* (2006.01)
(52) U.S. Cl.
 CPC ............. *B65G 47/82* (2013.01); *B65G 47/90* (2013.01); *B65G 2203/0233* (2013.01)
(58) Field of Classification Search
 CPC ........ B65G 47/90; B65G 47/48; B65G 47/82; B65G 2203/0233
 See application file for complete search history.

(56) References Cited

U.S. PATENT DOCUMENTS

| | | | | |
|---|---|---|---|---|
| 3,777,445 | A | * | 12/1973 | Anderson ............... B65B 61/26 53/442 |
| 5,181,652 | A | * | 1/1993 | Tanttu .................. B65D 5/4266 206/815 |
| 2018/0118399 | A1 | | 5/2018 | Aya et al. |
| 2020/0039746 | A1 | | 2/2020 | Lert, Jr. et al. |
| 2021/0130025 | A1 | * | 5/2021 | Schaafsma ............... B26D 1/01 |

FOREIGN PATENT DOCUMENTS

| | | |
|---|---|---|
| CN | 103224043 A | 7/2013 |
| CN | 104118588 A | 10/2014 |
| CN | 107639673 A | 1/2018 |
| CN | 109588060 A | 4/2019 |
| CN | 110356665 A | 10/2019 |
| WO | 2019123241 A1 | 6/2019 |

OTHER PUBLICATIONS

Office Action for Chinese Patent Application No. 202011437071.X dated Dec. 31, 2021. 9 pages.
Office Action for European Patent Application No. 20213051.4 dated Feb. 17, 2022. 4 pages.

* cited by examiner

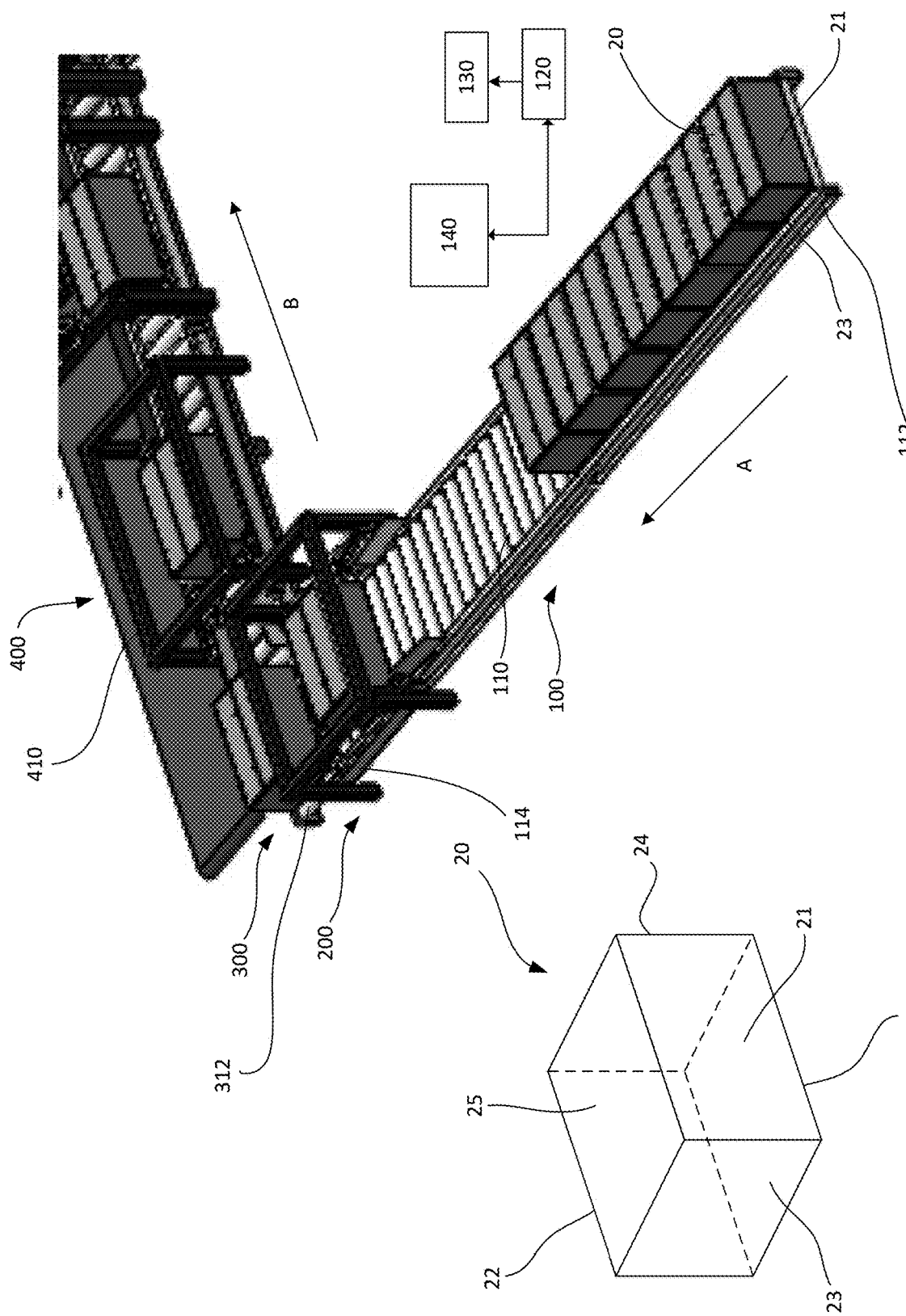

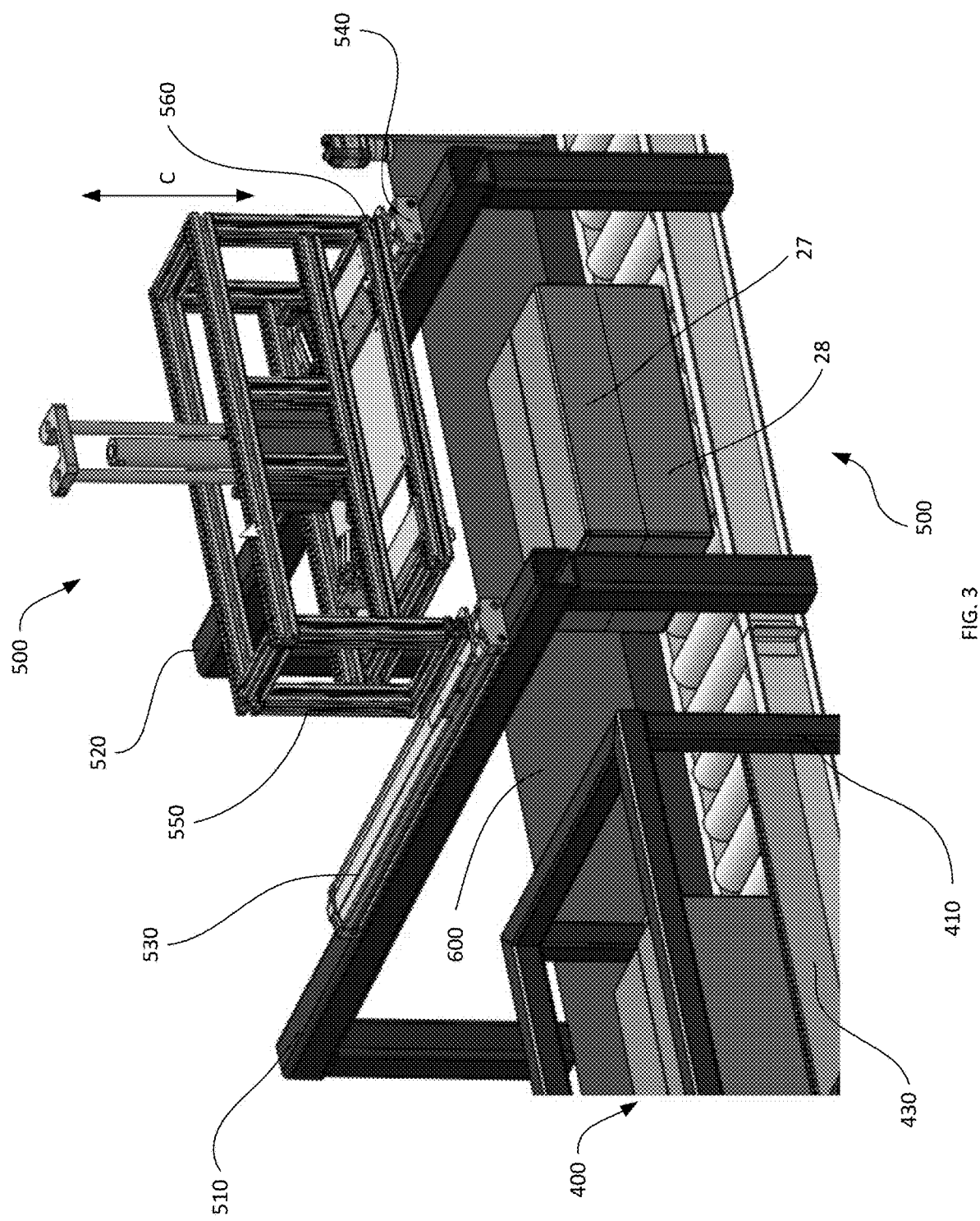

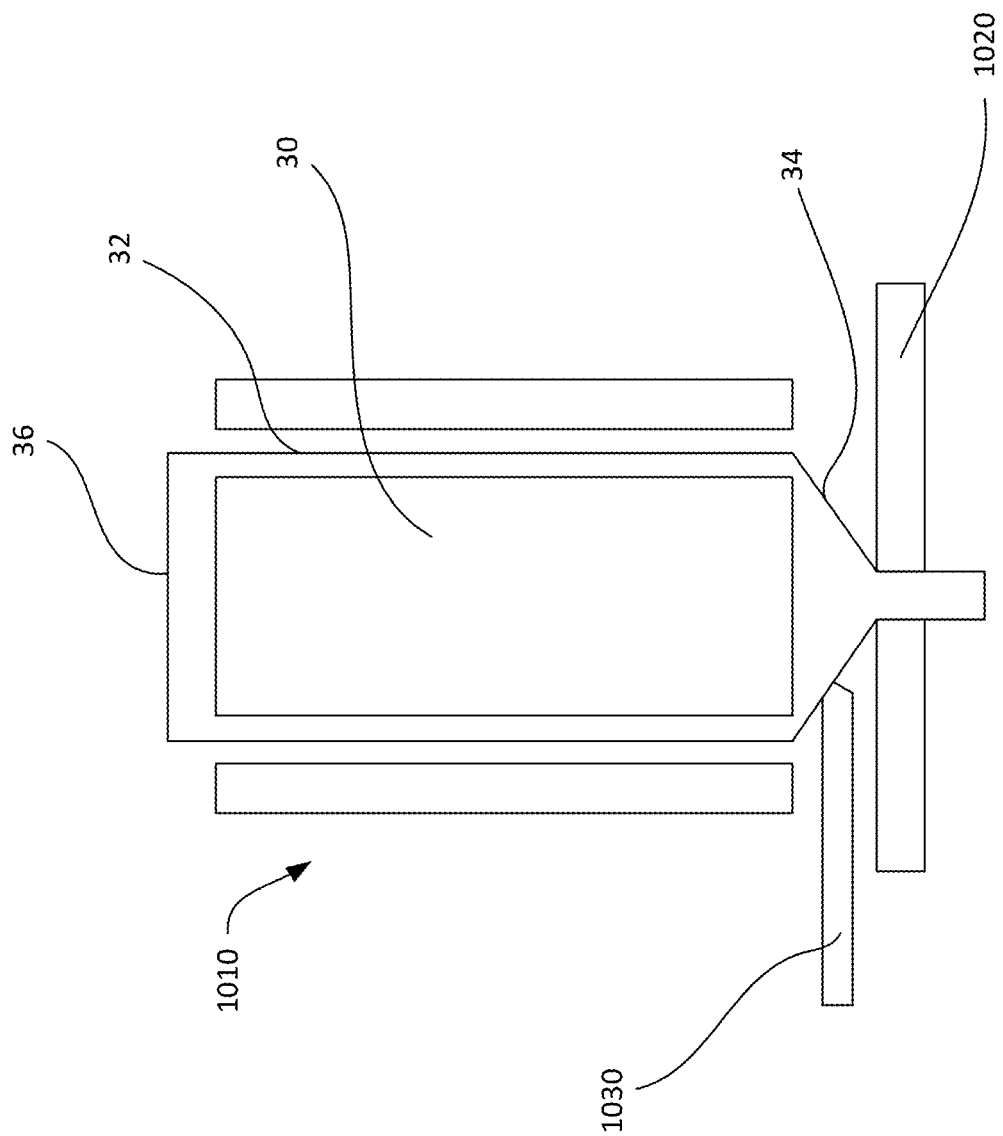

HARD DISK DRIVE TRANSFORMATION FROM OEM PACKAGING TO AUTOMATION FRIENDLY CONTAINERS

CROSS-REFERENCE TO RELATED APPLICATIONS

This application claims the benefit of the filing date of U.S. Provisional Patent Application No. 63/044,182 filed Jun. 25, 2020, the disclosure of which is hereby incorporated herein by reference.

BACKGROUND

Hard disk drives are typically wrapped in static-shield bags for protection from static charges during transportation and handling. Multiple hard disk drives are packed in a box. When the hard drives arrive at a facility in boxes, opening the boxes and removing the internal packaging involves extensive human labor and time for removing the hard disk drives from the boxes. Furthermore, removal of the unique dunnage or internal packaging requires special handling.

BRIEF SUMMARY

One aspect of the disclosure provides a system includes a cutting sub-system arranged for cutting a box into a first half and a second half and including at least one pair of cutting elements, a dunnage gripper sub-system arranged downstream of the cutting sub-system and including a dunnage gripper configured to selectively grip and release a portion of the box, and a robotic system including at least a first robotic arm and a second robotic arm. The first robotic arm includes a first plurality of grippers configured to selectively grip and release items contained in the box. The second robotic arm includes a second plurality of grippers configured to selectively position the items into a tote positioned at a second predetermined location. The box contains a plurality of items.

In some instances, the cutting sub-system comprises a first cutting sub-system comprising a first of the at least one pair of cutting elements configured to cut at least a first lateral wall of the box and a second lateral wall of the box opposite the first lateral wall and a second cutting sub-system comprising a second of the at least one pair of cutting elements configured to a third lateral wall of the box and a fourth lateral wall of the box opposite the third lateral wall, the third and fourth lateral walls being perpendicular to the first and second lateral walls.

In some instances, the system further includes a first conveyor mechanism configured to transport the box to the first cutting sub-system, the first conveyor mechanism having a first end and a second end.

In some instances, the first cutting sub-system comprises a first frame spanning across the first conveyor mechanism in vicinity of the second end and the first pair of cutting elements comprises a first cutting element mounted on the first frame on a first side of the first conveyor mechanism at a predetermined height and a second cutting element mounted on the first frame on a second side of the first conveyor mechanism at the predetermined height.

In some instances, the first and second cutting elements are spaced apart from one another by a first distance less than or equal to a dimension of the third and fourth lateral walls.

In some instances, the predetermined height of the first and second cutting elements is adjustable.

In some instances, the system further comprises a second conveyor mechanism arranged perpendicularly to the first conveyor mechanism in vicinity of the second end.

In some instances, the second cutting sub-system comprises a second frame spanning across the second conveyor mechanism. The second pair of cutting elements comprises a third cutting element mounted the second frame on a first side of the second conveyor mechanism at the predetermined height and a fourth cutting element mounted on the second frame on a second side of the second conveyor mechanism at the predetermined height.

In some instances, the third and fourth cutting elements are spaced apart from one another by a second distance less than or equal to a dimension of the first and second lateral walls.

In some instances, the predetermined height of the third and fourth cutting elements is adjustable.

In some instances, the dunnage gripper sub-system is arranged across the second conveyor mechanism. The dunnage gripper sub-system comprises a third frame spanning across the second conveyor mechanism, a fourth frame, parallel to the third frame, spanning across the second conveyor mechanism, a first guiding mechanism disposed on the third frame, a second guiding mechanism disposed on the fourth frame, and a gripper frame movably coupled to the first and second guiding mechanisms. The dunnage gripper is movably coupled to the gripper frame, the dunnage gripper configured to move upward relative to the gripper frame away from the second conveyor mechanism and downward relative to the gripper frame toward the second conveyor mechanism.

In some instances, the system further comprises a dunnage conveyor mechanism arranged parallel to the second conveyor mechanism. The third and fourth frames span across the dunnage conveyor mechanism.

In some instances, the system further comprises a dunnage detection subs-system comprising at least one sensor configured to detect presence of dunnage in one of the portions of the box and a pushing system configured to push one of the first half and the second half of the box from the second conveyor mechanism to the dunnage conveyor mechanism.

In some instances, the system further comprises a box reject conveyor mechanism. The pushing system comprises a fifth frame across the box reject conveyor mechanism, a first drive mechanism mounted to the fifth frame, and a first pushing plate operatively associated with the first drive mechanism and configured to sweep across the second conveyor mechanism toward the box reject conveyor mechanism.

In some instances, the system further comprises a box pushing system comprising a second drive mechanism and a second pushing plate operatively associated with the second drive mechanism and configured to sweep across the second conveyor mechanism toward the dunnage conveyor mechanism.

In some instances, the system further comprising a bag removal sub-system comprising a plurality of compartments, each of the plurality of compartments configured to receive one of the plurality of items, each of the plurality of items encased in a static-shield bag, a bag gripper associated with each of the plurality of compartments and configured to grip a bottom portion of the static-shield bag of the item received in corresponding compartment, and a bag cutting element associated with at least one of the plurality of compartments and configured to the cut the bottom portion of the static-shield bag gripped by the bag gripper.

In some instances, the first robotic arm is configured, using the first plurality of grippers, to remove a top portion of the static-shield bags from the plurality of compartments and to deposit the top portions of the static-shield bags onto the dunnage conveyor mechanism.

In some instances, the system further comprises a tote conveyor sub-system arranged in operational vicinity of the second conveyor mechanism and comprising a first cross-push sub-system configured to push an empty tote from the empty tote conveyor mechanism onto the full tote conveyor mechanism, and a second cross-push sub-system configured to push a rejected tote from the full tote conveyor mechanism onto the rejected tote conveyor mechanism.

In some instances, the first cross-push sub-system comprises a third drive mechanism, and a third pushing plate operatively associated with the third drive mechanism and configured to sweep across the empty tote conveyor mechanism toward the full tote conveyor mechanism. The second cross-push sub-system comprises a fourth drive mechanism and a fourth pushing plate operatively associated with the fourth drive mechanism and configured to sweep across the full tote conveyor mechanism toward the rejected tote conveyor mechanism.

In some instances, the robotic system further comprises an identification system configured for identifying the plurality of items and the tote.

BRIEF DESCRIPTION OF THE DRAWINGS

FIG. 2A illustrates an example of the box handled by the system of FIG. 1.

FIG. 2B shows a partial view of the system of FIG. 1 illustrating a first cutting sub-system, a box cross-push sub-system and a second box cutting sub-system.

FIG. 3 shows a partial view of the system of FIG. 1 illustrating an upper dunnage removal sub-system.

FIG. 6C schematically illustrates one compartment for receiving a hard disk drive encased in a static shield bag with a bag cutting mechanism, according to one implementation.

DETAILED DESCRIPTION

The technology relates generally to an automated handling system for hard disk drive boxes. One example includes a box conveyor sub-system, a first box cutting sub-system, a box cross-push sub-system, a second box cutting sub-system, an upper dunnage-removal sub-system, a dunnage conveyor sub-system, a box rejection sub-system including a box rejection conveyor, a first robotic pick-up sub-system, a lower dunnage removal sub-system, a hard disk drive bag removal sub-system, an empty tote conveyor sub-system, a second robotic drive pick-up sub-system, a full tote conveyor sub-system and a rejected tote conveyor sub-system.

By automating removal of the internal packaging, for example dunnage, retrieval of the hard disk drives from the boxes, and depositing of the hard disk drives into containers compatible with downstream human and/or automated processes, the manual labor and the time required for the same may be reduced. While the following description refers to hard drives specifically, the described de-boxing system may be used to de-box any other electronic or sensitive component from boxes and to remove internal packaging or dunnage, and minimize human labor and time.

Figure 1:
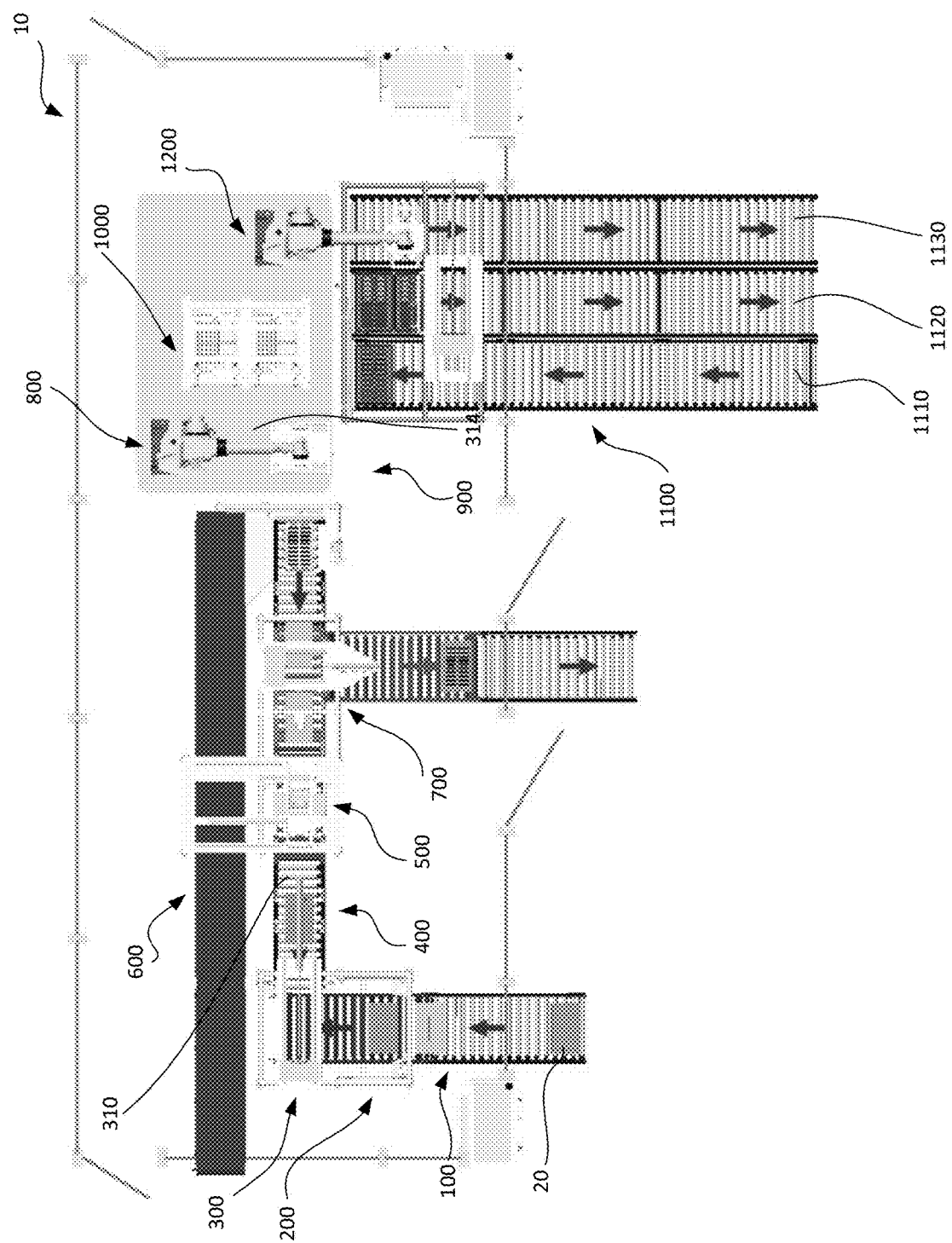
FIG. 1 illustrates an example of a system for automated system for de-boxing and removing hard disk drives from a box and depositing the hard disk drives into an automation friendly containers.

FIG. 1 illustrates a system 10 for automated handling of hard drive boxes. The system 10 may include a box conveyor sub-system 100, a first box cutting sub-system 200, a box cross-push sub-system 300, a second box cutting sub-system 400, a dunnage-removal sub-system 500, a dunnage conveyor sub-system 600, a dunnage detection and box rejection sub-system 700, a first robotic pick-up sub-system 800, a lower dunnage-removal sub-system 900, a hard disk drive bag removal sub-system 1000, a tote conveyer sub-system 1100 including an empty tote conveyor mechanism 1110, a full tote conveyor mechanism 1120, and a rejected tote conveyor mechanism 1130, and a second robotic pick-up sub-system 1200. The box conveyor sub-system 100 may receive a box 20 filled with hard disk drives encased in static-shielding bags. The illustrated system 10 is merely exemplary and may include more or less sub-systems than described. Furthermore, one or more sub-systems of the system 10, although described separately for the ease of understanding, may be combined, structurally and/or functionally.

Figure 4:
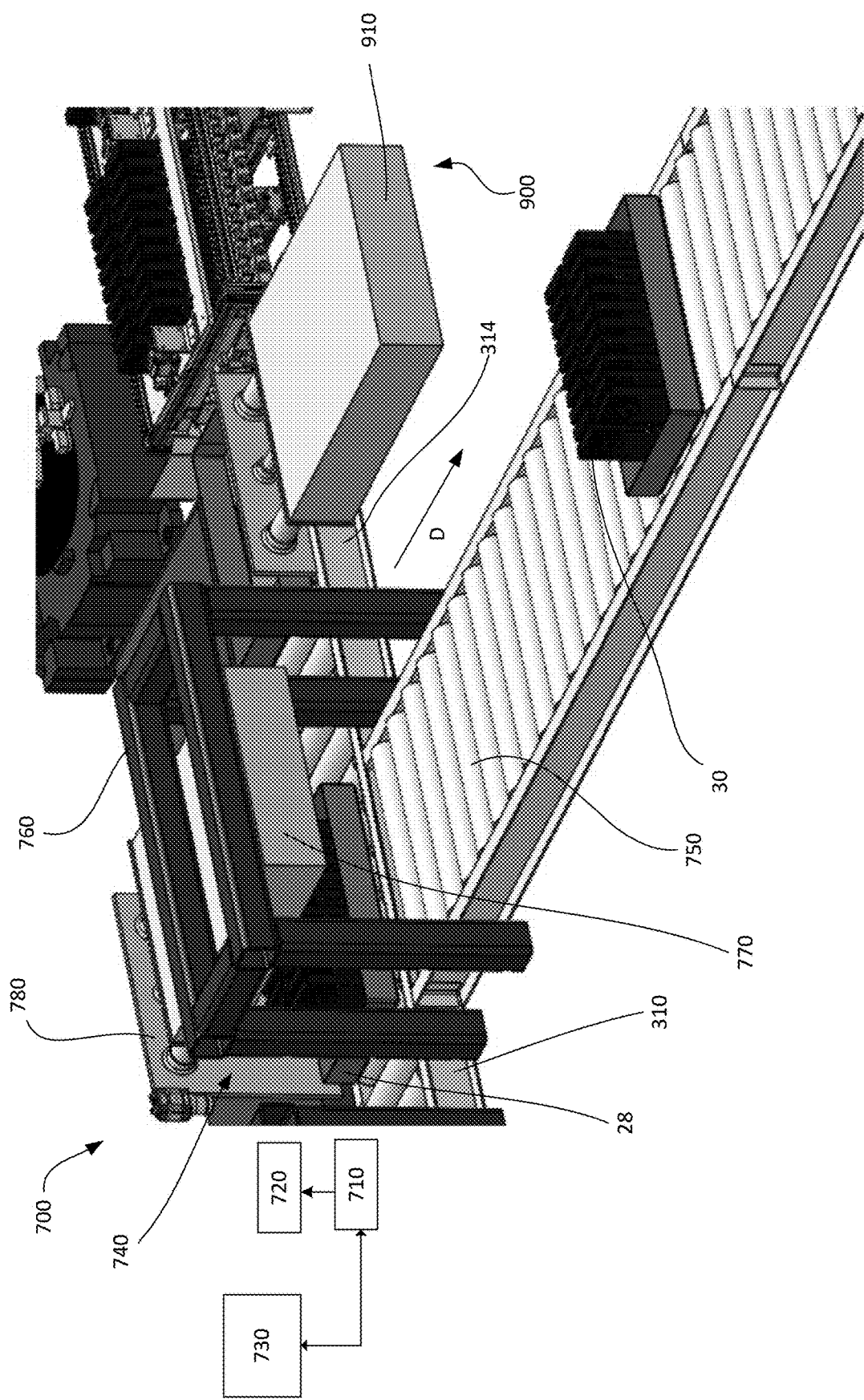
FIG. 4 shows a partial view of system of FIG. 1, illustrating a box rejection sub-system and a lower dunnage removal sub-system.

FIG. 2A illustrates a typical box 20 that contains one or more hard disk drives. The box 20 may contain multiple hard disk drives 30, as shown in FIG. 4. In this regard, the box may contain any number of hard drives, such as twenty (20) hard disk drives. The box 20 typically also includes dunnage to protect the hard disk drives 30 during transportation. Furthermore, in many cases, the dunnage may surround the hard disk drives 30 for maximum protection. For the sake of simplicity, the dunnage present on the top of the hard disk drives will be referred to as top dunnage and the dunnage present below the hard disk drives will be referred to as bottom dunnage. The box 20 may have a first lateral wall 21 and a second lateral wall 22 opposite the first lateral wall. A third lateral wall 23 and a fourth lateral wall 24 opposite the first third lateral wall are connected to the first lateral wall 21 and the second lateral wall 22. A top 25 and a bottom 26 are connected to the first, second, third, and fourth lateral walls 21, 22, 23, 24. In one example, the box 20 is rectangular in shape with first and second lateral walls 21, 22 forming the short sides and the third and fourth lateral walls 23, 24 forming the long sides of the rectangle. In other example, the box may have other shapes, such as, for example, square, with the first, second, third, and fourth laterals walls being equal in size to one another, or circular.

The box conveyor sub-system 100 includes a first conveyor mechanism 110. The first conveyor mechanism 110 may include, by way of non-limiting examples only, a conveyor belt or conveyor rollers, or any other such devices capable of conveying a box from one location to another. The first conveyor mechanism 110 may be configured to receive the box 20, at a first end 112, and to transport the box to a second end 114 of the first conveyor mechanism along a first direction of movement of the first conveyor mechanism, as indicated by arrow A. A motor or other such drive (not shown) may control the movement of the first conveyor mechanism 110. While in one example the first conveyor mechanism movement 110 is unidirectional from the first end 112 to the second end 114 as shown by the arrow A, in other examples, the conveyor mechanism movement may be bi-directional between the first end and the second end and/or multi-directional such that the conveyor mechanism movement may move in directions perpendicular or otherwise offset from the direction of arrow A. In one example, the first conveyor mechanism 110 has a width greater than at least the dimensions of the first and second lateral walls 21, 22.

In an example, the box 20 full of hard disk drives 30 may be received on the first conveyor mechanism 110 in a predetermined orientation. For example, the box 20 may be received such that the first and second lateral walls 21, 22 are perpendicular to the first direction of movement, along the arrow A, and the third and fourth lateral walls 23, 24 are parallel to the first direction of movement, along the arrow A, from the first end 112 to the second end 114.

The box conveyor sub-system 100 may include a camera 120 proximal to the first end 112 and an alarm system 130, for example in the form of an audio buzzer and/or a blinking light. The camera 120, in conjunction with a control system 140 in communication therewith, may be configured to detect the orientation of the box 20 relative to the first conveyor mechanism 110. The control system 140 may include one or more processors programed to perform signal processing or image processing operations on the images captured by the camera 120 to detect the orientation of the box 20. If a discrepancy in the orientation is detected by the camera 120 and the control system 140, the alarm system 130 may be activated. The control system 140 may be in communication with a motor or drive (not shown) configured to control the movement of the first conveyor mechanism 110. Additionally, the movement of the first conveyor mechanism 110 may also be interrupted by the control system 140 to prevent a mis-oriented box 20 from travelling further down the first conveyor mechanism. Such a mis-oriented box 20 may be removed from the first conveyor mechanism 110 manually in one configuration. In other examples, the box conveyor sub-system 100 may include, for example, a robotic arm (not shown) controlled, for example by the control system 140, to push, pick-up, or otherwise move the mis-oriented box off the first conveyor mechanism 110 either for further processing or for re-introduction onto the first conveyor mechanism in a desired orientation.

The first box cutting sub-system 200 may be arranged at the second end 114 of the first conveyor mechanism 110. The box 20 may loaded onto the first conveyor mechanism 110 at the first end 112 and transported to the first box cutting sub-system 200 at the second end 114. The first box cutting sub-system 200 may be configured to cut the third lateral wall 23 and the fourth lateral wall 24 of the box 20 at a predetermined height h from the bottom 26.

Figure 2C:
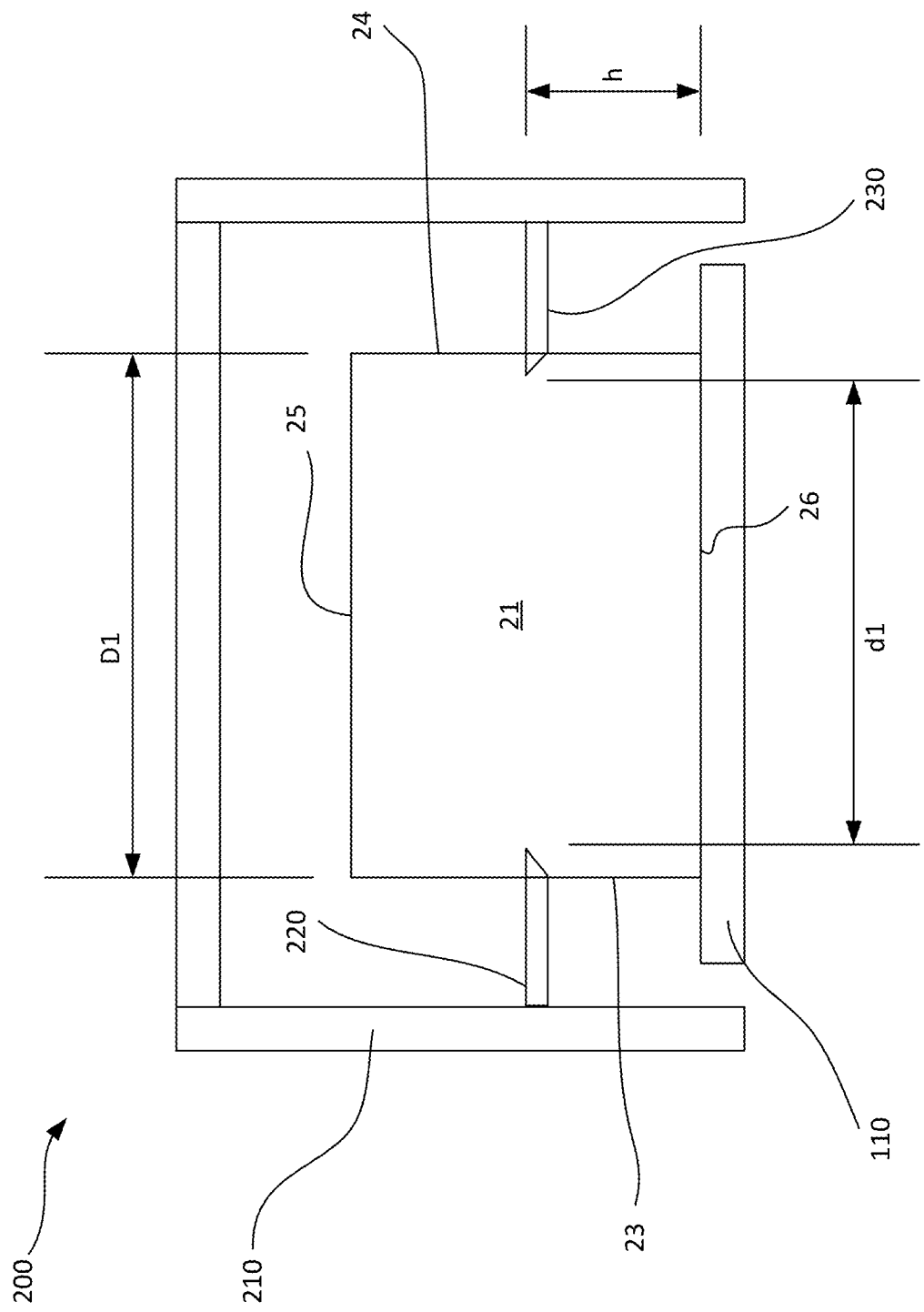
FIG. 2C shows a schematic elevational view of the first cutting sub-system of the system of FIGS. 1 and 2B.

Referring to FIG. 2C, the first box cutting sub-system 200 may include a first frame 210 spanning the first conveyor mechanism 110 and a first cutting element 220 and a second cutting element 230 spaced apart from the first cutting element mounted on the first frame, on either side of the first conveyor mechanism. The first and second cutting elements 220, 230 are mounted at the predetermined height h relative to the first conveyor mechanism 110, as shown in FIG. 2C. In other examples, the first and second cutting elements 220, 230 are mounted to the frame 210 such that their height h relative to the first conveyor mechanism 110 may be adjusted, depending on the size of the box 20.

While the distance between the first and second cutting elements 220, 230 may be fixed in some systems, the distance may be adjustable in other systems to accommodate boxes of different sizes. The first and second cutting elements 220, 230 are spaced apart from one another by a distance d1 generally equal to a dimension D1 of the first and second lateral walls 21, 22—shown in FIG. 2A, in an example. In another example, the first and second cutting elements 220, 230 are spaced apart from one another by a distance d1 slightly less than a dimension D1 of the first and second lateral walls 21, 22. Examples of first and second cutting element 220, 230 includes cutting blades, cutting wheels and like. In an example, the first and second cutting elements 220, 230 are fixedly secured to the first frame 210.

The fixed first and second elements 220, 230 may cut into the third lateral wall 23 and the fourth lateral wall 24, respectively, as the box 20 moves on the first conveyor mechanism 110. In an example, the movement of the first conveyor mechanism 110 is sufficient to force the box 20 between the first and second cutting elements 220, 230. In another example, the first conveyor mechanism 110 may include stops or holding blocks (not shown) securing the box 20 to the first conveyor mechanism. Such stops or holding blocks would prevent the relative movement of the box 20 on the first conveyor mechanism 110 when the box is urged against the first and second cutting elements 220, 230. In yet another example, a piston or a similar mechanism (not shown) may force the box 20 to along with the first conveyor mechanism 110 between the first and second cutting elements 220, 230. In an example, such piston or similar mechanism may be mounted to the first frame 210. In another example, such piston or similar mechanism may be mounted on a dedicated frame or support structure arranged in the vicinity of the first cutting sub-system 200. In other examples, the box 20 is stationary within the first frame 210, while the first and second cutting elements 220, 230 move relative to the third lateral wall 23 and the fourth lateral wall 24, respectively, cutting thereinto.

Referring to FIG. 2B, the box cross-push sub-system 300 may be positioned at the second end 114 of the first conveyor mechanism 110. In an example, the box cross-push sub-system 300 includes a second conveyor mechanism 310, as shown in FIG. 1, arranged generally perpendicular to the first conveyor mechanism 110. In one example, the box 20 travelling on the first conveyer mechanism 110 may be deposited onto the second conveyor mechanism 310 by the movement of the first conveyor mechanism 110. In other example, the box cross-push sub-system 300 may include a pushing mechanism (not shown) for selectively pushing the box 20 off the first conveyor mechanism 110 onto the second conveyor mechanism 310. In one example, the second conveyor mechanism 210 has a width greater than at least the dimension of the third and fourth lateral walls 23, 24.

The second conveyor mechanism 310 may include, by way of non-limiting examples only, a conveyor belt or conveyor rollers similar to the first conveyor mechanism 110. The second conveyor mechanism 310 may be configured to receive the box 20, at a first end 312, and to transport the box 20 to a second end 314 (FIG. 1) of the second conveyor mechanism 310 along a first direction of movement of the second conveyor mechanism, as shown by an arrow B. The first direction of movement of the second conveyor mechanism illustrated by the arrow B is generally perpendicular to the first direction of movement of the first conveyor mechanism 110 illustrated by the arrow A. Thus, the box 20 conveyed by the first conveyor mechanism 110 will land on the second conveyor mechanism 310 such that the first lateral wall 21 and the second lateral wall 22 of the box are parallel to the first direction of movement of the second conveyor mechanism shown by the arrow B and the third lateral wall 23 and the fourth lateral wall 24 are perpendicular to the first direction of movement of the second conveyor mechanism. Although the direction of movement of the second conveyor mechanism is shown as being generally perpendicular to the first direction of movement, the direction of movement of the second conveyor may be any direction relative to the first direction of movement. If the direction of movement of the second conveyor mechanism 310 is not perpendicular to the first direction of movement of the first conveyor mechanism 110, the system 10 may further include an orientation mechanism (not shown) to orient the box 20 in a desired orientation on the second conveyor mechanism.

Figure 2D:
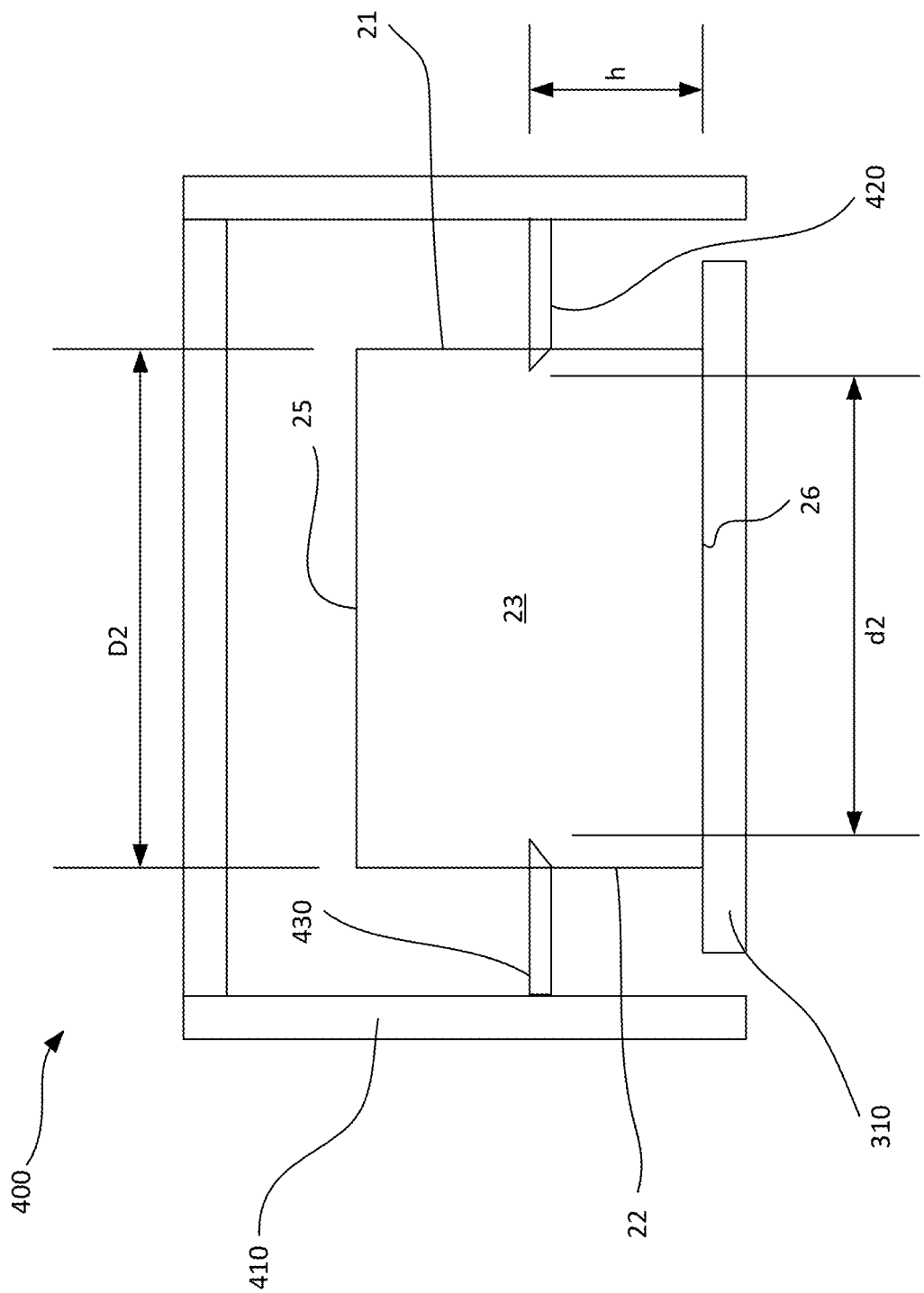
FIG. 2D shows a schematic elevational view of the second cutting sub-system of the system of FIGS. 1 and 2B.

The second box cutting sub-system 400, as shown in FIGS. 2B and 2D, may be configured to cut the first lateral wall 21 and the second lateral wall 22 of the box 20 at the predetermined height h. The second box cutting sub-system 400 may be similar to the first box cutting sub-system 200. In an example, the second box cutting sub-system 400 includes a second frame 410, spanning the second conveyor mechanism 310. A third cutting element 420 and a fourth cutting element 430, spaced apart from the third cutting element, are mounted on the second frame 410. Examples of third and fourth cutting element includes cutting blades, cutting wheels and like, and may be similar to the first and second cutting elements 220, 230. While a distance d2 between the third and fourth cutting elements 420, 430 may be fixed in some systems, the distance may be adjustable in other systems to accommodate boxes of different sizes. The third and fourth cutting elements 420, 430 are spaced apart from one another by the distance d2 generally equal to a dimension D2 of the third lateral wall 23 and fourth lateral wall 24 of the box 20, in an example. In another example, the third and fourth cutting elements 420, 430 are spaced apart from one another by the distance d2 slightly less than the dimension D2 of the third lateral wall 23 and the fourth lateral wall 24.

In an example, the third and fourth cutting elements 420, 430 cut into the first lateral wall 21 and the second lateral wall 22, respectively, as the box 20 moves on the second conveyor mechanism 310. In an example, the movement of the second conveyor mechanism 310 is sufficient to force the box 20 between the third and fourth cutting elements 420, 430. In another example, the second conveyor mechanism 310 may include stops or holding blocks (not shown) securing the box 20 to the second conveyor mechanism. Such stops or holding blocks would prevent the relative movement of the box 20 on the second conveyor mechanism 310 when the box is urged against the third and fourth cutting elements 420, 430. In yet another example, a piston or a similar mechanism (not shown) may force the box 20 to along with the second conveyor mechanism 310 between the third and fourth cutting elements 420, 430. In other examples, the box 20 may be stationary, while the third and fourth cutting elements 420, 430 move relative to the first lateral wall 21 and the second lateral wall 22, respectively, cutting thereinto.

Cutting the first and second lateral walls 21, 22 at the predetermined height h at the second box cutting sub-system 400, preceded by cutting the third and fourth lateral walls 23, 24 at the same predetermined height h at the first box cutting sub-system 200 causes the box 20 to be cut into a top half 27 and a bottom half 28, as shown in FIG. 3. It will be noted that the term "half" is used for ease of reading and is not limited to geometric half of the box 20. In other words, the box 20 may be cut either into two symmetrical halves 27, 28 or asymmetrical halves 27, 28, with one of the halves 27, 28 being larger than the other.

In an example, a single system may perform the function of the first cutting sub-system 200 and the second cutting sub-system 400. For instance, such a system may include a first pair of cutting elements similar to the first and second cutting elements 220, 230, mounted on a frame similar to the first frame 210, for cutting the third and fourth lateral walls 23, 24. A second pair of cutting elements may be movably mounted on the frame for cutting the first and second lateral walls 21, 22.

Downstream of the second box cutting sub-system 400 a dunnage removal sub-system 500 may be arranged, as further shown in FIG. 3. The dunnage removal sub-system 500 may include a first frame 510 and a second frame 520 spanning across the second conveyor mechanism and the dunnage conveyor mechanism 600, arranged generally parallel to the second conveyor mechanism. The first and second frames 510, 520 include a first rail 530 and a second rail 540, respectively, or similar guiding mechanisms. A dunnage gripper frame 550 is movably mounted on the first and second rails. In a first position, the dunnage gripper frame 550 may be positioned over the second conveyor mechanism 310, as illustrated in FIG. 3. In a second position (not shown), the dunnage gripper frame 550 may be positioned over the dunnage conveyor mechanism 600. A dunnage gripper 560 may be movably mounted on the dunnage gripper frame 550 such that the dunnage gripper may move toward the second conveyor mechanism 310 in a downward movement relative to the dunnage gripper frame 550 and may move away from the second conveyor mechanism in an upward movement relative to the dunnage gripper frame 550, as indicated by a double-headed arrow C. The dunnage gripper 560 may be configured to selectively grab and release one of the halves 27, 28 of the cut box 20 along with the associated dunnage. In the illustrated example, the dunnage gripper 560 is configured to grab and release the top half 27 of the box 20 including the top 26 and the upper dunnage (not shown).

Thus, in an operational mode, when the dunnage gripper frame 550 is positioned over the second conveyor mechanism 310 over the box 20 cut by the second box cutting sub-system 400, the dunnage gripper 560 may be lowered in a downward movement relative to the dunnage gripper frame 550 to grab the top half 27 of the cut box 20 and the upper dunnage (not shown). In an example, the dunnage gripper 560 is configured to grip the top half 27 of the cut box 20 and the upper dunnage (not shown) in a single movement. In another example, the dunnage gripper 560 is configured to first grip the top half 27 of the cut box 20 in a first movement and the upper dunnage (not shown) in a second, subsequent movement. In other examples, the dunnage gripper 560 may be operated to have more than two movements to remove the top half 27 of the cut box 20 and the upper dunnage. For instance, the dunnage gripper 560 may be actuated multiple times to remove all the upper dunnage.

After gripping the top half 27 of the box 20 and/or the upper dunnage in a single or multiple movements, the dunnage gripper 560 may then be moved upwards, relative to the dunnage gripper frame 550, along with the top half 27 of the box 20 and/or the upper dunnage. The dunnage gripper frame 550 may then be moved along the first and second rails 530, 540 such that the dunnage gripper 560 is positioned over the dunnage conveyor mechanism 600. The dunnage gripper 560 may then release the top half 27 of the box 20 and/or the upper dunnage onto the dunnage conveyor mechanism 600. Once the top half 27 of the box 20 and/or the upper dunnage are deposited on the dunnage conveyor mechanism 600, the dunnage gripper frame 550 may then be moved along the first and second rails 530, 540 to be positioned over the second conveyor mechanism 310.

Figure 5:
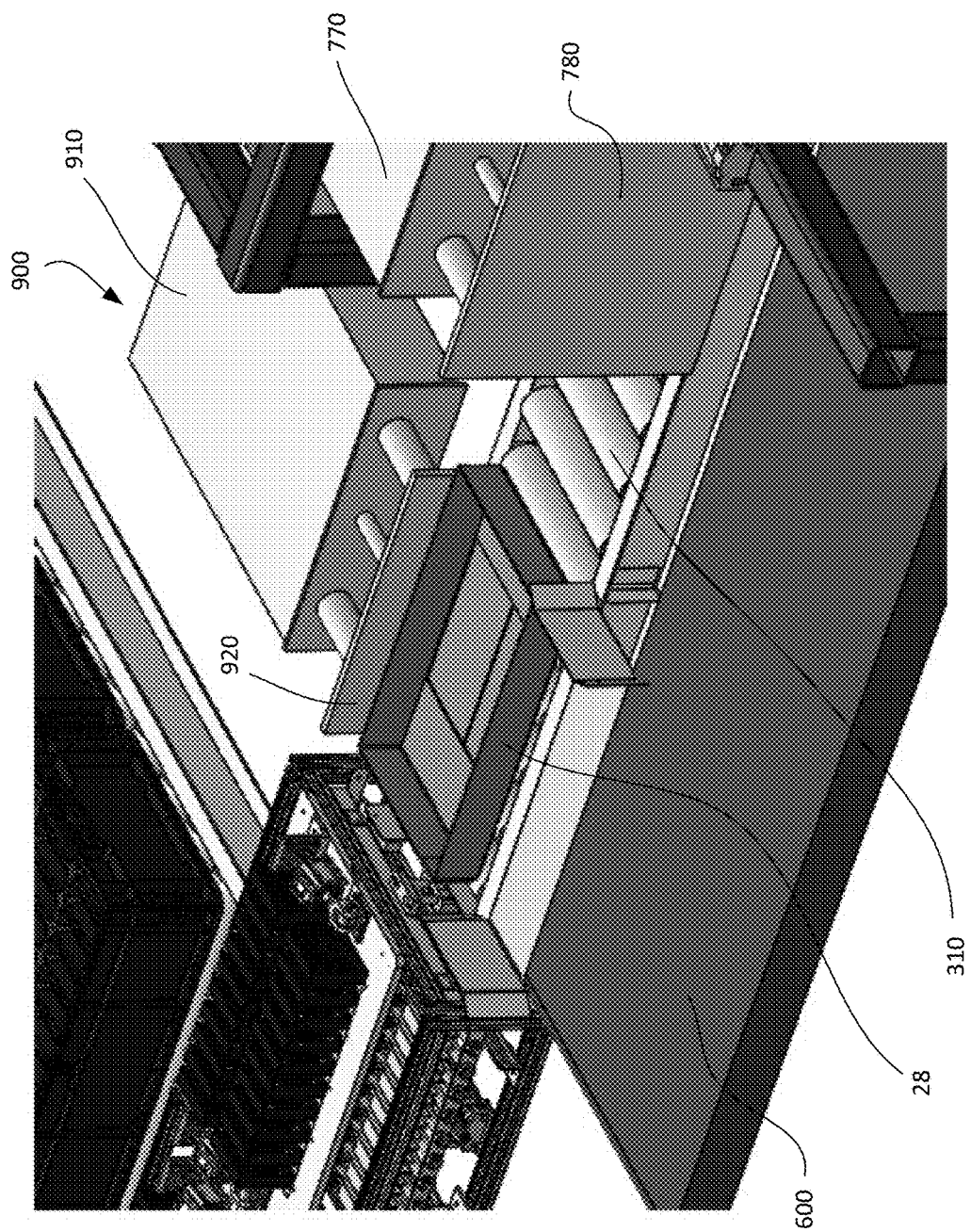
FIG. 5 shows another view of the lower dunnage removal sub-system of FIG. 4 and an empty box conveyor sub-system.

Referring now to FIGS. 4 and 5, the system 10 may further include a dunnage detection and box rejection sub-system 700 downstream of the dunnage removal sub-system 500 detecting presence of any dunnage in the box 20 which may interfere with or hinder further processing of the hard disk drives 30 present in the cut box 20. The dunnage detection and box rejection sub-system 700 includes one or more sensors 710, an alarm 720, a control system 730, and a pushing system 740.

The sensor 710 in cooperation with the control system 730 may be configured to detect the presence of dunnage in the bottom half 28 of the box 20. In an example the sensor 710 includes an optical sensor. Other examples of the sensors 710 include photo eyes, a laser distance sensor and 2D inspection optics. In an example, the sensor 710 is configured to read the barcodes, QR codes, or other such identifiers on the hard disk drives 30 in the bottom half 28 of the box 20. The control system 730 may include one or more processors programmed to process signals received from the sensor 710. If all the barcodes or other such identifiers of the hard disk drives 30 are not readable, for example because of presence of an obstruction, it may be determined that the top dunnage has not been properly or completely removed at the dunnage removal sub-system 500. In another example, if all the hard disk drives 30 or a correct predetermined number of hard disk drives 30 in the bottom half 28 of the box 20 are not detected by the sensor 710, it may be determined that the bottom half of the box is not suitable for further processing. In an example, the alarm 720 may be activated if it is determined that the dunnage has not been properly or completely removed or the bottom half 28 of the box 20 is not suitable for further processing.

The control system 730 may be configured to activate the pushing system 740 to push the bottom half 28 of the box 20 off the second conveyor mechanism 310. The pushing system 740 may be configured to selectively push the bottom half 28 of the box 20 off the second conveyor mechanism 310. In an example, the pushing system 740 is configured to exert force on the bottom half 28 of the box 20 in a direction generally perpendicular to the second conveyor mechanism 310. Examples of the pushing system 740 include a pneumatic drive or a Powered Right Angle Transfer.

A box reject conveyor 750 may be arranged in operational vicinity of the second conveyor mechanism 310, as further shown in FIG. 4. In an example, the box reject conveyor 750 is arranged generally perpendicular to the second conveyor mechanism 310. Although the direction of movement of the box reject conveyor mechanism 750 is shown as being generally perpendicular to the first direction of movement of the second conveyor mechanism 310, the direction of movement of the box reject conveyor may be any direction relative to the first direction of movement. The pushing system 740 may be configured to selectively push the bottom half 28 of the box 20 from the second conveyor mechanism 310 onto the box reject conveyor 750. The box reject conveyor 750 may be similar to the first conveyor mechanism 110 and/or the second conveyor mechanism 310. The box reject conveyor 750 may be similar to the first conveyor mechanism 110 if the box reject conveyor is arranged perpendicular to the second conveyor mechanism 310.

The pushing system 740 includes a frame 760, a drive mechanism 770 and a pushing plate 780. In the illustrated example, the frame 760 spans over the box reject conveyor 750. The drive mechanism 770 may be mounted to the frame 760. The pushing plate 780 is operatively associated with the drive mechanism 770. In a first operational state, the pushing plate 780 may be configured to be positioned on a side of the second conveyor mechanism 310 opposite the side proximal the box reject conveyor 750. When actuated by the drive mechanism 770, the pushing plate 780 may be configured to sweep across the second conveyor mechanism 310 toward the box reject conveyor 750. Thus, when the bottom half 28 of the box 20 is present on the second conveyor mechanism 310, and the drive mechanism 770 is activated, the pushing plate 780 pushes the bottom half 28 of the box 20 off the second conveyor mechanism onto the box reject conveyor 750 in a direction depicted by an arrow D.

If the sensor 710 in cooperation with the control system 730 does not detect any abnormality, the bottom half 28 of the box 20, along with the hard disk drives 30, is permitted to move along the second conveyor mechanism 310 to the second end 314 (FIG. 1).

Figure 6A:
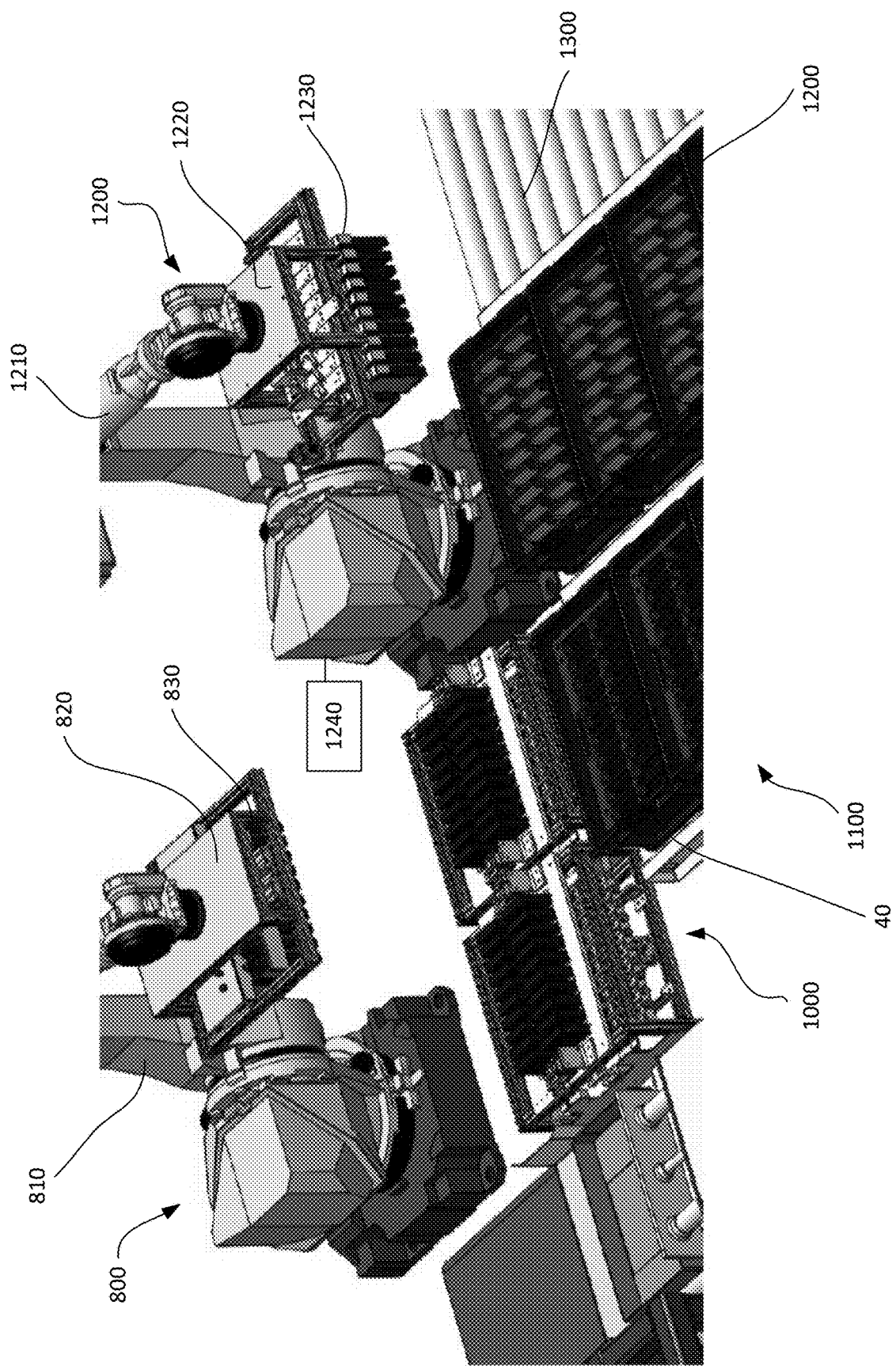
FIG. 6A shows a partial view of the system of FIG. 1, illustrating a hard disk drive bag removal sub-system, a first robotic pick-up sub-system, and a second robotic pick-up sub-system.
Figure 6B:
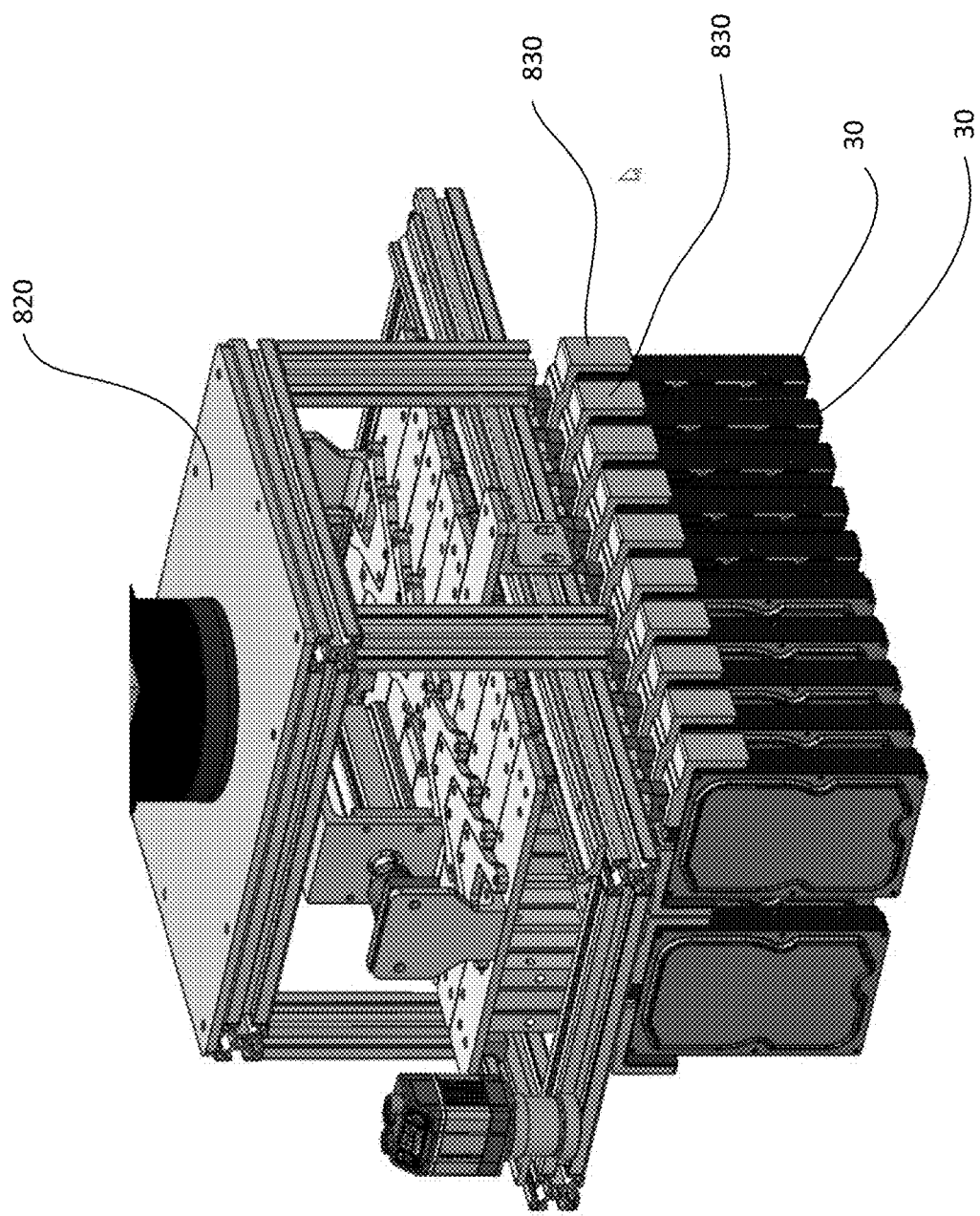
FIG. 6B shows a gripper mechanism with multiple grippers associated with the first robotic pick-up system of FIG. 6A, according to one implementation.

Referring back to FIG. 1 along with FIG. 6A-6B, the system 10 may further include the first robotic hard disk drive pick-up system 800 downstream of the dunnage detection system 700. The first robotic hard disk drive pick-up system 800 includes a robotic arm 810 and a gripper mechanism 820. The robotic arm 810 may be configured to move about six (6) axes, i.e., both positive (+) and negative (−) directions along X, Y, and Z axes.

The gripper mechanism 820 may include multiple grippers 830, each configured to releasably secure an item, for example, a hard disk drive. The number and arrangement of the grippers 830 correspond to the number and position of the hard disk drives 30 packed in the box 20, in an example. In one example, the first robotic pick-up system 800 may pick up all the hard disk drives 30 from the bottom half 28 of the box 20 in a single movement. In other examples, the number of grippers 830 may be lower than the number of hard disk drives 30 packed in the box 20. In this example, the first robotic pick-up system 800 may be activated multiple times to pick up all the hard disk drives 30 from the bottom half 28 of the box 20. The first robotic pick-up system 800 is thus configured to pick multiple hard disk drives 30, each encased in a static-shield from the bottom half 28 of the box 20, and to deposit the same into the bag removal sub-system 1000.

Referring now to FIG. 5 along with FIG. 6A, the system 10 may include a second box pushing system 900. The second box pushing system 900 may be configured to push the empty bottom half 28 of the box 20 from the second conveyor mechanism 310 onto the dunnage conveyor mechanism 600. The second box pushing system 900 may include a drive mechanism 910 and a pushing plate 920. In one operational state, the pushing plate 920 rests on the same side of the second conveyor mechanism 310 as the box reject conveyor 750. When actuated, the pushing plate 920 sweeps across the second conveyor mechanism to the opposite side, i.e., toward the dunnage conveyor mechanism 600. Once all the hard disk drives 30 have been picked from the bottom half 28 of the box 20, the drive mechanism 910 may be operated to actuate the pushing plate 920. When actuated, the pushing plate 920 pushes the empty bottom half 28 of the box 20 from the second conveyor mechanism 310 onto the dunnage conveyor mechanism 600. In another example, a receptacle (not shown) for collecting empty bottom half 28 of the box 20 may be placed in vicinity of the second conveyor mechanism 310 instead of the dunnage conveyor mechanism 600.

Referring now to FIGS. 6A and 6B, the bag removal sub-system 1000 may include a plurality of compartments 1010, each configured to receive a hard disk drive 30 encased in a static-shield bag 32. In an example, a bag gripper 1020 and a bag cutting element 1030 may be associated with each compartment 1010. In another example, a bag cutting element 1030 may be associated with more than one compartment 1010. The bag gripper 1020 may be configured to selectively grip a bottom portion 34 of the bag 32 and to hold the bottom portion taut. The bag cutting element 1030, which may be arranged in the vicinity of the bag gripper 1020, may be configured to cut the bottom portion 34 of the bag 32 held tautly by the bag gripper 1020. If the bag cutting element 1030 is associated with more than one compartment 1010, the bag cutting element may cut the bottom portions 34 of the bags 32 held tautly by the bag grippers 1020 of the associated compartments. Once the bag 32 are cut at one end, the first robotic pick-up system 800 may be activated to grip the bags 32 at the other end 36 and pull the bag 32 off the hard disk drive 30 resting in each of the plurality of compartments 1010 and leaving the hard disk drive 30 in the compartment 1010. The cut bags 32 may then be deposited onto the dunnage conveyor mechanism 600, in an example. In another example, the cut bags 32 may be deposited in a receptacle (not shown).

Figure 6D:
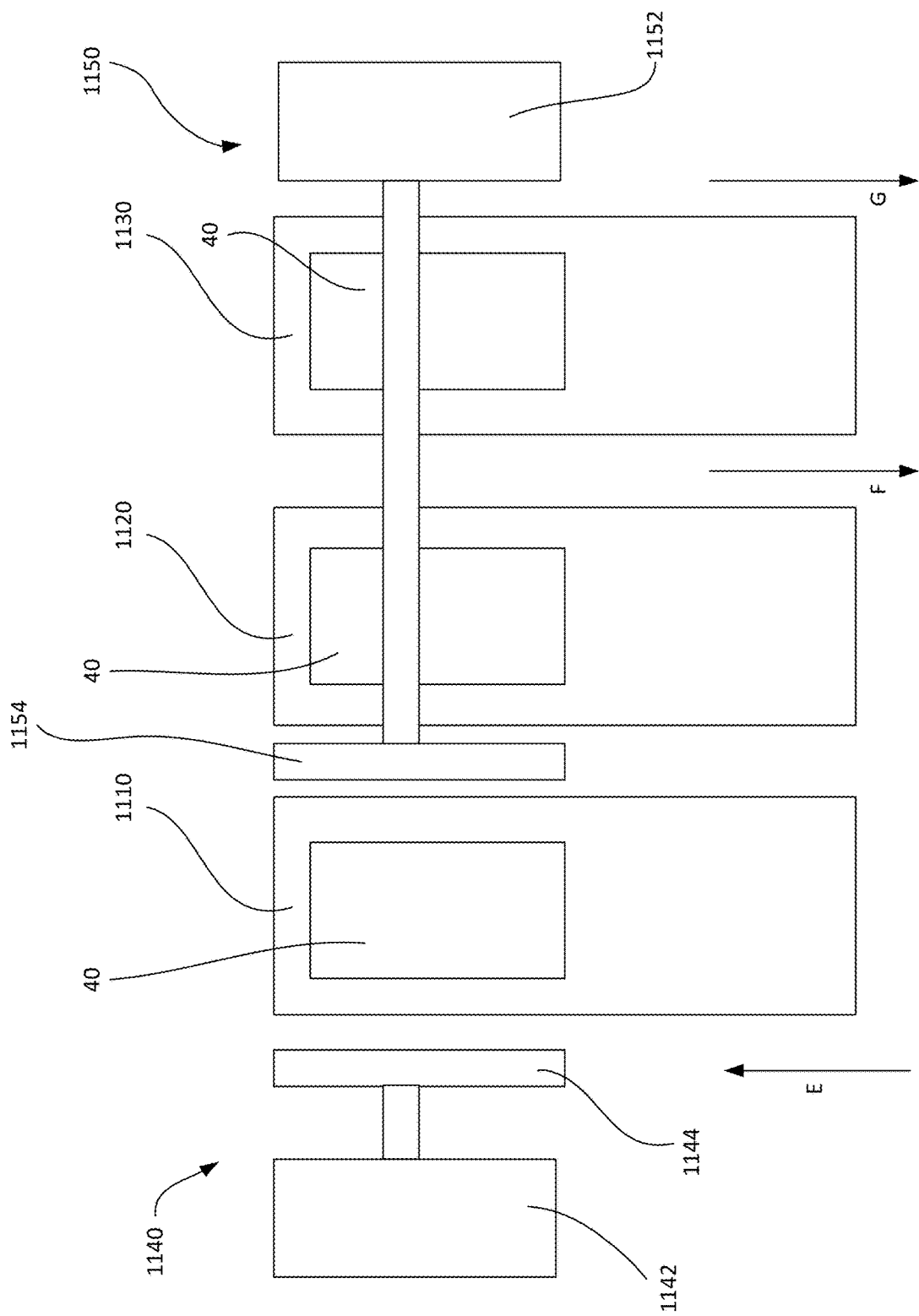
FIG. 6D schematically illustrates a plan view of a tote cross-push sub-system of the system of FIG. 1, according to one implementation.

Referring back to FIG. 1 along with FIGS. 6A and 6D, the tote conveyer sub-system 1100 may be arranged in operational vicinity of the second conveyor mechanism 310. The tote conveyor sub-system 1100 may include an empty tote conveyor mechanism 1110, a full tote conveyor mechanism 1120, and a rejected tote conveyor mechanism 1130, all arranged generally adjacent the bag removal sub-system 1000 and the second robotic hard disk drive pick-up system 1200. In an example, the empty tote conveyor mechanism 1110, the full tote conveyor mechanism 1120, and the rejected tote conveyor mechanism 1130 are arranged parallel to one another. In an example, the empty tote conveyor mechanism 1110 is configured to move in at least one direction toward the second conveyor mechanism 310 as depicted by an arrow E. The full tote conveyor mechanism 1120 may be configured to move in at least one direction away from the second conveyor mechanism 310, as depicted by an arrow F, in an example. The rejected tote conveyor mechanism 1130 may be configured to move in at least one direction away from the second conveyor mechanism 310, as depicted by an arrow F, in an example. In other examples, one or more of the empty tote conveyor mechanism 1110, the full tote conveyor mechanism 1120 and the rejected tote conveyor mechanism 1130 may be configured to move bi-directional, i.e., towards and away from the second conveyor mechanism 310.

A first cross-push sub-system 1140 may include a drive mechanism 1142 and a pushing plate 1144. The first cross-push sub-system 1140 may be similar to the pushing system 740 and/or the second box pushing system 900. The first cross-push sub-system 1140 may be configured to push an empty tote 40 received on the tote conveyor mechanism 1110 onto the full tote conveyor mechanism 1120. A second cross-push sub-system 1150 includes a drive mechanism 1152 and a pushing plate 1154. The second cross-push sub-system 1150 may be configured to selectively push a rejected tote 40 from the full tote conveyor mechanism 1120 to the rejected tote conveyor mechanism 1130. A tote 40 may be rejected before being filled with the hard disk drives 30, if, for example, the structural integrity of the tote is compromised. A tote 40 may also be rejected after being filled with the hard disk drives 30, if, for example, it is determined that the hard disk drives 30 were deposited in the tote in an unsatisfactory manner.

Referring back to FIG. 1 along with FIG. 6A-6B, the system 10 may further include the second robotic hard disk drive pick-up system 1200 downstream of the dunnage detection system 700 and the first robotic hard disk drive pick-up system 800. The second robotic hard disk drive pick-up system 1200 includes a robotic arm 1210 and a gripper mechanism 1220. The robotic arm 1210 may be configured to move about six (6) axes, i.e., both positive (+) and negative (−) directions along X, Y, and Z axes. The gripper mechanism 1220 includes the multiple grippers 1230, each configured to releasably secure an item, for example, the hard disk drive 30. The number and arrangement of the grippers 1230 correspond to the number and position of the hard disk drives 30 received in the compartments 1010 of the bag removal sub-system 1000, in an example. In this example, the second robotic pick-up system 1200 may pick up all the hard disk drives 30 from the compartments 1010 in a single movement. In other examples, the number of grippers 1230 may be lower than the number of hard disk drives 30 received in the compartments 1010. In this example, the second robotic pick-up system 1200 may be activated multiple times to pick up all the hard disk drives 30 from the compartments 1010. The second robotic pick-up system 1200 is thus configured to pick multiple hard disk drives 30, each removed from the static-shield bag 32 from the compartments 1010, and to deposit the same into the tote 40 on the full tote conveyor mechanism 1120. Thus, the empty tote conveyor mechanism 1120 may be configured to transport an empty tote 40 in operational vicinity of the second robotic pick-up system 1200, whereas the full tote conveyor mechanism 1130 and the rejected tote conveyor mechanism 1140 are configured to transport the full tote 40 and the rejected tote 40, respectively, away from the second robotic pick-up system 1200. In yet another example, the number of the grippers 1230 may correspond to the number of hard disk drives 30 which may be deposited in the empty tote 40. In an example, the number of hard disk drives which may be deposited in the empty tote 40 may be the same as the number of hard disk drives in the box 20.

The second robotic pick-up system 1200 includes an identification system 1240 for identifying hard disk drives 30 as well as the totes 40. For example, the identification system 1240 may include a bar code reader configured to read the bar codes of the hard disk drives 30 and the totes 40. The bar codes of the hard disk drives 30 deposited in a particular tote 40 may be associated with the bar code of the tote 40, for example in a database for tracking the hard disk drives and the totes. The tote 40 filled with hard disk drives 30 in an acceptable manner is permitted to travel down the full tote conveyor mechanism 1120 for further handling. Rejected totes 40, which may be empty or full or partially full of hard disk drives 30, may be pushed over onto the rejected tote conveyor mechanism 1120. Rejected totes 40 may be forwarded for further processing, which may be manual processing or automated processing.

Figure 7:
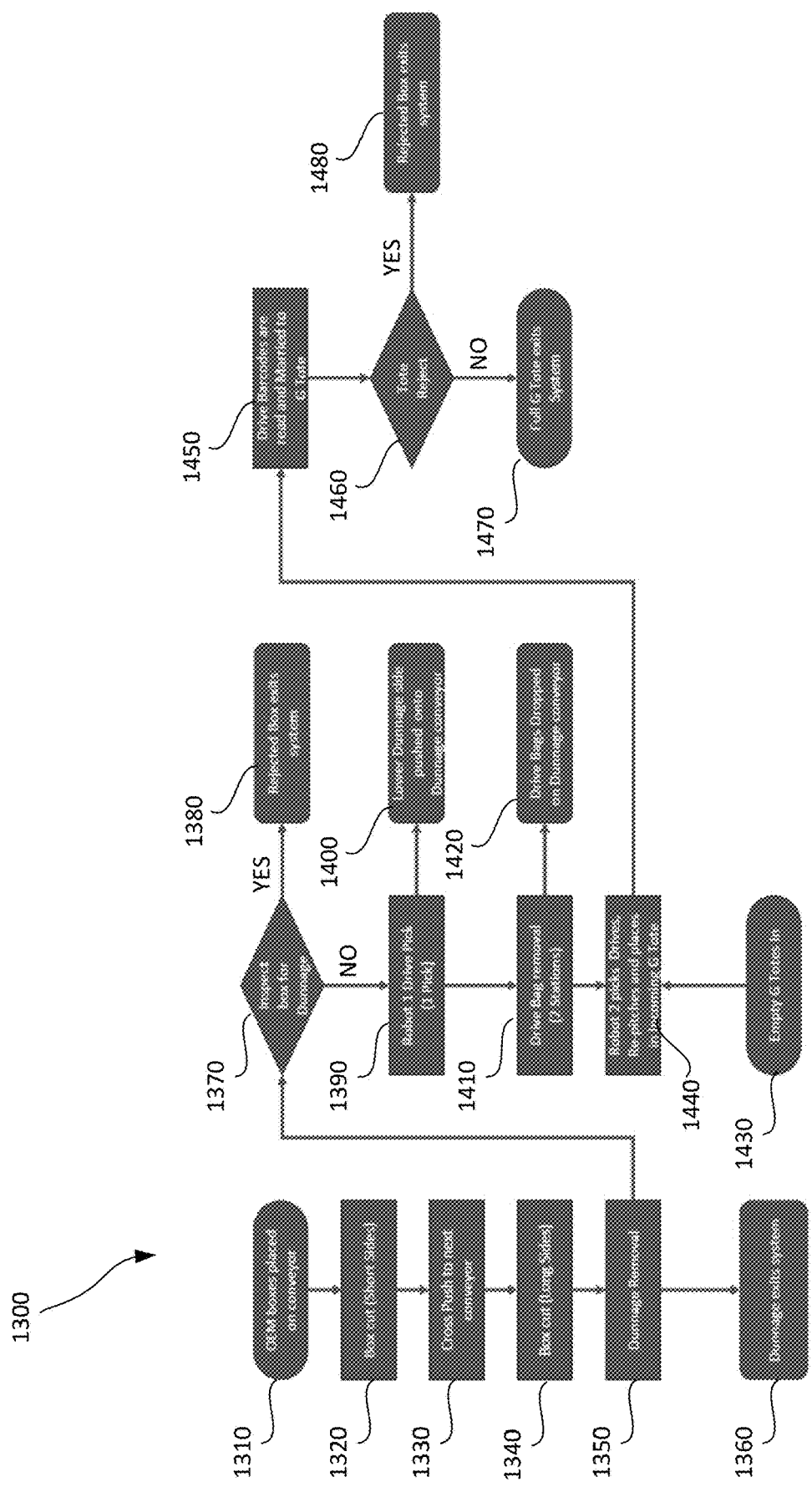
FIG. 7 is a flow chart for a method of automatically de-boxing and removing hard disk drives from a box and depositing the hard disk drives into automation friendly containers, according to an aspect of the disclosure.

Another aspect of the disclosure relates to a method 1300 for automatically de-boxing the hard disk drive boxes, as illustrated in the flow diagram of FIG. 7. At step 1310, the box 20 containing a number of hard disk drives 30 is placed on the first conveyor mechanism 100. At step 1320, the short sides, or the third and fourth lateral walls 23, 24 are cut at the first box cutting sub-system 200. At step 1330, the box 20 cross-pushed from the first conveyor mechanism 100 to the second conveyor mechanism 310. At step 1340, the long sides, or the first and second lateral walls 21, 22 are cut at the second box cutting sub-system 400. At step 1350, the top half 27 of the box and the upper dunnage are removed by the dunnage removal sub-system 500. At step 1360, the upper dunnage and the top half 27 of the box 20 are removed via the dunnage removal sub-system 500 and deposited on the dunnage conveyor sub-system 600. At step 1370, the cut open box 20 is inspected by the dunnage detection sub-system 700 to determine if the upper dunnage has been properly and/or completely removed. If the presence of dunnage is detected by the dunnage detection sub-system 700, the bottom half 28 of the box 20 is rejected and pushed off onto the box reject conveyor mechanism 750. At step 1390, if no dunnage is detected by the dunnage detection sub-system 700, the first robotic pick-up system 800 picks the hard disk drives 30 from the bottom half 28 and deposited in the bag removal sub-system 1000.

At step 1400, after the hard disk drives 30 have been picked up, the bottom half 28 including any lower dunnage is pushed off onto the dunnage conveyor sub-system 600. At step 1410, the static-shield bags 32 are removed in the bag removal sub-system 1000. At step 1420, the first robotic pick-up system 800 picks up the bags and deposit the same onto the dunnage conveyor sub-system 600, while leaving the hard disk drives 30 in the compartments 1010 of the bag removal sub-system 1000. At step 1430, an empty tote 40 is pushed from the empty tote conveyor mechanism 1120 onto the full tote conveyor mechanism 1130. At step 1440, the second robotic pick-up sub-system 1200 picks up the hard disk drives 30 from the bag removal sub-system 1000 and deposits them in the empty tote 40 positioned on the full tote conveyor mechanism 1120. At step 1450, the bar codes of the hard disk drives deposited in the tote 40 are associated with the bar code of the tote 40. At step 1460, the tote is inspected, for example for integrity and/or to determine a correct number of hard disk drives 30 have been deposited in the tote 40. At step 1470, the tote 40 full of hard disk drives 30 is forwarded for further processing of the hard disk drives 30, if the tote 40 is not rejected. At step 1480, if the tote 40 is rejected, the tote is pushed off onto the rejected tote conveyor mechanism 1130.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
a cutting sub-system arranged for cutting a box into a first portion and a second portion and comprising at least one pair of cutting elements;
a dunnage gripper sub-system arranged downstream of the cutting sub-system and comprising a dunnage gripper configured to selectively grip and release a portion of the box;
a robotic system comprising at least a first robotic arm and a second robotic arm, the first robotic arm comprising a first plurality of grippers configured to selectively grip and release items contained in the box, the second robotic arm comprising a second plurality of grippers configured to selectively position the items into a tote positioned at a second predetermined location; and
a bag removal sub-system comprising:
a plurality of compartments, each of the plurality of compartments configured to receive one of the items contained in the box;
a bag gripper associated with each of the plurality of compartments and configured to grip a bottom portion of a static-shield bag of the item received in a corresponding one of the plurality of compartments; and
a bag cutting element associated with at least one of the plurality of compartments and configured to the cut the bottom portion of the static-shield bag gripped by the bag gripper.

2. The system according to claim 1, wherein the cutting sub-system comprises:
a first cutting sub-system comprising a first of the at least one pair of cutting elements configured to cut at least a first lateral wall of the box and a second lateral wall of the box opposite the first lateral wall; and
a second cutting sub-system comprising a second of the at least one pair of cutting elements configured to a third lateral wall of the box and a fourth lateral wall of the box opposite the third lateral wall, the third and fourth lateral walls being perpendicular to the first and second lateral walls.

3. The system according to claim 2, further comprising a first conveyor mechanism configured to transport the box to the first cutting sub-system, the first conveyor mechanism having a first end and a second end.

4. The system according to claim 3, wherein the first cutting sub-system comprises a first frame spanning across the first conveyor mechanism in vicinity of the second end, and
wherein the first pair of cutting elements comprises a first cutting element mounted on the first frame on a first side of the first conveyor mechanism at a predetermined height and a second cutting element mounted on the first frame on a second side of the first conveyor mechanism at the predetermined height.

5. The system according to claim 4, wherein the first and second cutting elements are spaced apart from one another by a first distance less than or equal to a dimension of the third and fourth lateral walls.

6. The system according to claim 4, wherein the predetermined height of the first and second cutting elements is adjustable.

7. The system according to claim 1, wherein the second cutting sub-system comprises a second frame spanning across the second conveyor mechanism,
wherein the second pair of cutting elements comprises a third cutting element mounted the second frame on a first side of the second conveyor mechanism at the predetermined height and a fourth cutting element mounted on the second frame on a second side of the second conveyor mechanism at the predetermined height.

8. The system of claim 7, wherein the third and fourth cutting elements are spaced apart from one another by a second distance less than or equal to a dimension of the first and second lateral walls.

9. The system of claim 7, wherein the predetermined height of the third and fourth cutting elements is adjustable.

10. The system according to claim 1, wherein the first robotic arm is configured, using the first plurality of grippers, to remove a top portion of the static-shield bags from the plurality of compartments and to deposit the top portions of the static-shield bags onto a dunnage conveyor mechanism.

11. The system according to claim 1, further comprising a tote conveyor sub-system arranged in operational vicinity of a second conveyor mechanism and comprising:
an empty tote conveyor mechanism configured to transport an empty tote to an operational vicinity of the second robotic arm;
a full tote conveyor mechanism configured to transport a full tote away from the second robotic arm; and
a rejected tote conveyor mechanism configured to transport a rejected tote away from the second robotic arm.

12. The system according to claim 11, wherein the tote conveyor sub-system further comprises:
a first cross-push sub-system configured to push an empty tote from the empty tote conveyor mechanism onto the full tote conveyor mechanism; and
a second cross-push sub-system configured to push a rejected tote from the full tote conveyor mechanism onto the rejected tote conveyor mechanism.

13. The system according to claim 12, wherein the first cross-push sub-system comprises:
a third drive mechanism; and
a third pushing plate operatively associated with the third drive mechanism and configured to sweep across the empty tote conveyor mechanism toward the full tote conveyor mechanism, and
wherein the second cross-push sub-system comprises:
a fourth drive mechanism; and
a fourth pushing plate operatively associated with the fourth drive mechanism and configured to sweep across the full tote conveyor mechanism toward the rejected tote conveyor mechanism.

14. The system according to claim 1,
wherein the robotic system further comprises an identification system configured for identifying the plurality of items and the tote.

15. A system comprising:
a cutting sub-system arranged for cutting a box into a first half and a second half and comprising at least one pair of cutting elements;
a dunnage gripper sub-system arranged downstream of the cutting sub-system and comprising a dunnage gripper configured to selectively grip and release a portion of the box; and
a robotic system comprising at least a first robotic arm and a second robotic arm, the first robotic arm comprising a first plurality of grippers configured to selectively grip and release items contained in the box, the second robotic arm comprising a second plurality of grippers configured to selectively position the items into a tote positioned at a second predetermined location,
a first conveyor mechanism configured to transport the box to the first cutting sub-system, the first conveyor mechanism having a first end and a second end,
a second conveyor mechanism arranged perpendicularly to the first conveyor mechanism in vicinity of the second end,
wherein the dunnage gripper sub-system is arranged across the second conveyor mechanism, and
wherein the dunnage gripper sub-system comprises:
a third frame spanning across the second conveyor mechanism;
a fourth frame, parallel to the third frame, spanning across the second conveyor mechanism;
a first guiding mechanism disposed on the third frame;
a second guiding mechanism disposed on the fourth frame; and
a gripper frame movably coupled to the first and second guiding mechanisms,
wherein the dunnage gripper is movably coupled to the gripper frame, the dunnage gripper configured to move upward relative to the gripper frame away from the second conveyor mechanism and downward relative to the gripper frame toward the second conveyor mechanism.

16. The system according to claim 15, further comprising a dunnage conveyor mechanism arranged parallel to the second conveyor mechanism,
wherein the third and fourth frames span across the dunnage conveyor mechanism.

17. The system according to claim 16, further comprising a box pushing system comprising:
a second drive mechanism; and
a second pushing plate operatively associated with the second drive mechanism and configured to sweep across the second conveyor mechanism toward the dunnage conveyor mechanism.

18. The system according to claim 15, further comprising a dunnage detection subs-system comprising:
at least one sensor configured to detect presence of dunnage in one of the portions of the box; and
a pushing system configured to push one of the first half and the second half of the box from the second conveyor mechanism to the dunnage conveyor mechanism.

19. The system according to claim 18, further comprising a box reject conveyor mechanism,
wherein the pushing system comprises:
a fifth frame across the box reject conveyor mechanism;
a first drive mechanism mounted to the fifth frame; and
a first pushing plate operatively associated with the first drive mechanism and configured to sweep across the second conveyor mechanism toward the box reject conveyor mechanism.

* * * * *